Patented Oct. 2, 1928.

1,686,486

UNITED STATES PATENT OFFICE.

HYYM E. BUC, OF ROSELLE, NEW JERSEY, ASSIGNOR TO STANDARD OIL DEVELOPMENT COMPANY, A CORPORATION OF DELAWARE.

DRIER AND THE COMBINATION THEREOF WITH DRYING OILS.

No Drawing.   Application filed September 26, 1927. Serial No. 222,216.

This invention relates to driers comprising the manganese salt of an oil soluble sulphonic acid and the combination thereof with drying oils.

When petroleum distillates and particularly lubricating distillates are treated with fuming sulphuric acid or sulphuric anhydride, certain acids are formed and are found in the oil phase at the expiration of the treatment. These acids are characterized by the presence of sulphur in combination and are predominantly oil soluble. For the purposes of this application they are termed oil soluble sulphonic acids and the metallic derivatives thereof, oil soluble sulphonates. These acids are ordinarily neutralized to form oil soluble sodium sulphonate and extracted from the oil phase by the use of a selective solvent such as a mixture of alcohol and water. After the extraction and separation of the solvent containing dissolved sulphonate, the same is heated to distill off the solvent, leaving a residue of crude oil soluble sodium sulphonate together with some petroleum oil.

In accordance with my method, I preferably remove any oil which accompanies the sulphonate by dissolving the crude material in an aqueous alcoholic solution, preferably containing 35 to 65% by weight of alcohol and thereafter contacting the solution so made with a small proportion of gasoline, say one-tenth to one-fifth of the total volume. A number of such extractions with gasoline may be employed successively although I usually employ from four to six. The oil migrates selectively into the gasoline phase, leaving an alcoholic solution of sodium sulphonate relatively free of oil.

The sodium sulphonate is then recovered from solution by evaporation of the solvent and is dissolved in water to be converted into manganese sulphonate by the usual metathetical reactions. I preferably dissolve the sodium sulphonate to form a dilute aqueous solution thereof, viz, one containing 5% or less of sodium sulphonate. Manganese chloride or other soluble salt of manganese is then gradually added to the solution with continuous stirring until precipitation ceases. The crude plastic manganese sulphonate so precipitated contains entrained moisture and some unconverted sodium sulphonate. The entrained moisture is preferably removed by the use of the centrifuge or similar means. The manganese sulphonate is then agitated with water and if it disintegrates, manganese chloride solution is again gradually added in amounts sufficient to produce complete coagulation. This washing and coagulation may be repeated a number of times if necessary until the manganese sulphonate is relatively free of sodium sulphonate and no longer disintegrates when agitated with water.

The manganese sulphonate so produced is then dissolved in an organic solvent in which inorganic material is insoluble. The sulphonate is freely soluble in ethyl, methyl, or isopropyl alcohol, benzol, or a mixture comprising these solvents in any proportion. I preferably employ ethyl or isopropyl alcohol of 75% or greater gravimeter concentration. After solution settling and/or filtration, the solvent is evaporated to leave a residue of purified dry oil soluble manganese sulphonate.

The manganese sulphonate so obtained is then combined with a drying oil to which pigments, resins, and/or diluents may be added. I preferably introduce from 1/4 to 1% of manganese sulphonate based on the total weight of paint or varnish. The manganese sulphonate functions as a drier and in this way paints and varnishes of excellent drying characteristics may be more economically manufactured than was previously possible. The manganese sulphonate may of course be used in combination with other driers if desired.

The foregoing description of my method is in illustration and various alternative compositions may be adopted within the scope of the appended claims, in which it is my intention to claim broadly all novelty inherent in the invention.

I claim:

1. A composition of matter comprising a drying oil and the manganese salt of an oil soluble sulphonic acid derived from the treatment of petroleum oils with fuming sulphuric acid or sulphuric anhydride.

2. A paint or varnish comprising the manganese salt of an oil soluble sulphonic acid derived from the treatment of petroleum oils with fuming sulphuric acid or sulphuric anhydride.

3. A drier for use with drying oils comprising the manganese salt of an oil soluble sulphonic acid derived from the treatment of petroleum oils with fuming sulphuric acid or sulphuric anhydride.

HYYM E. BUC.